United States Patent Office 2,830,052
Patented Apr. 8, 1958

2,830,052

NEW TRIAZINE DERIVATIVES

Stanley Birtwell, Walter Hepworth, and Gilbert Joseph Stacey, Manchester, England, assignors to Imperial Chemical Industries Limited, London, England, a corporation of Great Britain No Drawing. Application June 21, 1955
Serial No. 517,057

Claims priority, application Great Britain July 9, 1954

12 Claims. (Cl. 260—249.5)

This invention relates to new triazine derivatives and more particularly it relates to new triazine derivatives which are useful in chemotherapy as anti-protozoal agents, more particularly as antimalarials.

According to the invention we provide the said new triazine derivatives which are of the formula:

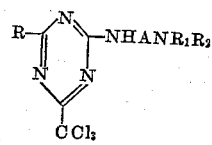

wherein R stands for an anilino radical, the phenyl radical of which may optionally bear substituents or for a phenyl-guanidino radical, the phenyl radical of which may optionally bear halogeno substituents, A stands for a hydrocarbon linking group and $R_1$ and $R_2$ stand for hydrogen or for alkyl radicals or they may be united to form, together with the adjacent nitrogen atom, a heterocyclic ring.

We have found that the said new triazine derivatives of the stated formula possess useful antiprotozoal action in experimental infections in animals and particularly we have found that they possess useful antimalarial action against experimental infections in mice and in chicks.

According to a further feature of the invention we provide a process for the manufacture of those of the said new triazine derivatives wherein R stands for an anilino radical, the phenyl radical of which may optionally bear substituents which comprises heating a biguanide of the formula:

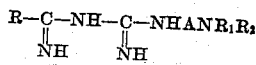

wherein A, $R_1$ and $R_2$ have the meaning stated above and R stands for an anilino radical, the phenyl radical of which may optionally bear substituents, with an acylating derivative of trichloroacetic acid.

Suitable acylating derivatives of trichloroacetic acid are for example trichloroacetic anhydride, trichloroacetyl chloride and certain trichloroacetic esters. The reaction may be carried out optionally in the presence of an inert solvent or diluent which may be for example trichloroacetic acid.

It may be supposed, and this is offered merely by way of explanation, that the first step in the reaction is an acylation, by means of the trichloroacetic acid derivative, of one of the NH groups of the said biguanide and that the trichloroacetyl derivative of the biguanide so formed, under the influence of heat, undergoes further condensation with ring-closure to form the triazine derivative.

According to a further feature of the invention we provide a process for the manufacture of those of the said new triazine derivatives wherein R stands for a phenylguanidino radical, the phenyl radical of which may optionally bear halogeno substituents which comprises heating a compound of the formula:

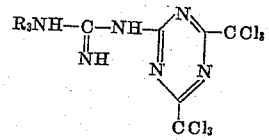

wherein $R_3$ stands for a phenyl radical which may optionally bear halogeno substituents, with a compound of the formula:

$$H_2N.A.NR_1R_2$$

wherein A, $R_1$ and $R_2$ have the meaning stated above.

The reaction may optionally be carried out in the presence of an inert solvent or diluent which may be for example benzene.

The invention is illustrated but not limited by the following examples in which the parts are by weight.

Example 1

15 parts of $N^1$-p-chlorophenyl-$N^5$-γ-dimethylaminopropyldiguanide are added to a stirred mixture of 46.5 parts of trichloroacetic anhydride and 8 parts of trichloroacetic acid. The mixture is then heated at 100° C. for 1 hour, cooled and made alkaline to Clayton yellow by addition of 8% aqueous sodium hydroxide solution. It is then extracted with ether and the extract is dried. There is then added a solution of hydrogen chloride in ethanol until no further precipitation occurs. The mixture is then filtered and the solid is dissolved in the minimum quantity of dry methanol. Dry ether is added and the mixture is filtered. The solid residue consists of the dihydrochloride of 2-p-chloranilino-4-γ-dimethylaminopropylamino-6-trichloromethyl-1:3:5-triazine, M. P. (with decomposition) 224°–226° C.

Example 2

11 parts of $N^1$-3:4-dichlorophenyl-$N^5$-γ-dimethylaminopropyldiguanide trihydrochloride are mixed with 46.5 parts of trichloroacetic anhydride at 30°–40° C. The mixture is heated at 100° C. for 90 minutes and is then cooled. By isolating the product as described in Example 1, there is obtained 2-(3:4-dichloroanilino)-4-γ-dimethylaminopropylamino-6-trichloromethyl-1:3:5-triazine dihydrochloride which decomposes at 202–206° C.

Example 3

21.5 parts of $N^1$-p-chlorophenyl-$N^5$-β-dimethylaminoethyldiguanide and 93 parts of trichloroacetic anhydride, are heated together as described in Example 1. There is obtained 2 - p - chloroanilino-4-β-dimethylaminoethylamino-6-trichloromethyl - 1:3:5 - triazine dihydrochloride which decomposes at 175° C.

Example 4

6 parts of $N^1$-p-methoxyphenyl-$N^5$-γ-dimethylaminopropyldiguanide and 18.6 parts of trichloroacetic anhydride are heated together as described in Example 1 and there is obtained 2-p-methoxyanilino-4-γ-dimethylaminopropylamino-6-trichloromethyl-1:3:5-triazine dihydrochloride which decomposes at 224–225° C.

Example 5

3.25 parts of $N^1$-phenyl-$N^5$-γ-dimethylaminopropyldiguanide carbonate are added to a mixture of 18.5 parts of trichloroacetic anhydride and 1.65 parts of trichloroacetic acid. The mixture is then heated at 100° C. for 1 hour. By isolating the product as described in Example 1, there is obtained 2-anilino-4-γ-dimethylaminopropylamino-6-trichloromethyl-1:3:5 - triazine dihydrochloride which decomposes at 216–224° C.

Example 6

3.25 parts of N¹-p-chlorophenyl-N⁵-β-piperidinoethyl-diguanide and 18.5 parts of trichloracetic anhydride are heated together as described in Example 1. There is thus obtained 2-p-chloroanilino-4-β-piperidinoethylamino-6-trichloromethyl-1:3:5-triazine dihydrochloride which decomposes at 147–149° C.

Example 7

3.05 parts of N¹-p-nitrophenyl-N⁵-γ-dimethylaminopropyldiguanide are added to a mixture of 18.5 parts of trichloroacetic anhydride and 1.65 parts of trichloracetic acid. The mixture is heated at 100° C. for 90 minutes, cooled and made alkaline to Clayton yellow by addition of 8% aqueous sodium hydroxide solution. It is then extracted with ether and the extract is dried. The ether is distilled and the residue is crystallised from benzene to give 2-γ-dimethylaminopropylamino-4-p-nitroanilino - 6-trichloromethyl-1:3:5-triazine which decomposes at 172–174° C.

Example 8

2.1 parts of 2-p-chlorophenylguanidino - 4:6 - bistrichloromethyl-1:3:5-triazine, 0.8 part of γ-dimethylaminopropylamine and 15 parts of benzene are heated together under reflux for 30 minutes. The mixture is cooled and filtered. The solid residue is 2-p-chlorophenylguanidino-4 - (γ-dimethylaminopropylamino) - 6 - trichloromethyl-1:3:5-triazine as a colourless crystalline solid, M. P. 188–189° C.

The 2-p-chlorophenylguanidino-4:6-bistrichloromethyl-1:3:5-triazine used as starting material may be obtained by heating together a mixture of 2.2 parts of 2:4:6-tristrichloromethyl-1:3:5-triazine, 0.85 part of p-chlorophenylguanidine and 30 parts of benzene under reflux for three hours. The mixture is cooled and filtered and the solid residue is 2-p-chlorophenylguanidino - 4:6 - bistrichloromethyl-1:3:5-triazine as a colourless crystalline solid, M. P. 216–218° C.

Example 9

2.1 parts of 2-p-chlorophenylguanidino-4:6-bistrichloromethyl-1:3:5-triazine, 1 part of δ-diethyl amino-α-methylbutylamine and 20 parts of benzene are heated together under reflux for 16 hours. The mixture is then cooled, washed with water, and extracted repeatedly with dilute acetic acid. The combined acid extracts are made alkaline with dilute aqueous sodium hydroxide solution and immediately extracted with ether. The ethereal extract is washed with water, dried and acidified with ethereal hydrogen chloride. The ether is distilled in vacuo. The solid residue consists of 2-p-chlorophenylguanidino-4-(δ-diethylamino - α - methylbutylamino)-6-trichloromethyl-1:3:5-triazine hydrochloride, M. P. 72° C.

What we claim is:

1. Triazine derivatives of the formula:

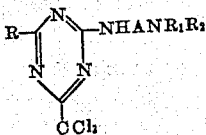

wherein R stands for a member of the group consisting of anilino, chloroanilino, lower alkoxy anilino, nitroanilino, phenylguanidino, and chlorophenylguanidino radicals, A stands for an alkylene linking group containing up to five carbon atoms, and R₁ and R₂ are selected from the group consisting of hydrogen, lower alkyl radicals and a piperidino radical formed by joining R₁ and R₂ together with the adjacent nitrogen atom.

2. 2-p-chloroanilino- 4 -γ-dimethylaminopropylamino-6-trichloromethyl-1:3:5-triazine.

3. 2-(3':4'-dichloroanilino)-4 - γ - dimethylaminopropylamino-6-trichloromethyl-1:3:5-triazine.

4. 2-p-chloroanilino - 4 - β-piperidinoethylamino-6-trichloromethyl-1:3:5-triazine.

5. 2 - γ - dimethylaminopropylamino-4-p-nitroanilino-6-trichloromethyl-1:3:5-triazine.

6. 2-p-chlorophenylguanidino - 4 - γ - dimethylaminopropylamino-6-trichloromethyl-1:3:5-triazine.

7. Process for the manufacture of triazine derivatives of the formula:

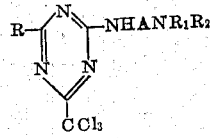

wherein R stands for a member of the group consisting of anilino, chloroanilino, lower alkoxy anilino and nitroanilino radicals, A stands for an alkylene linking group containing up to five carbon atoms, and R₁ and R₂ are selected from the group consisting of hydrogen, lower alkyl radicals and a piperidino radical formed by joining R₁ and R₂ together with the adjacent nitrogen atom, which comprises heating a biguanide of the formula:

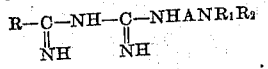

wherein A, R, R₁ and R₂ have the meaning stated above with an acylating derivative of trichloroacetic acid, said acylating derivative being selected from the group consisting of trichloroacetic anhydride, trichloroacetyl chloride and trichloroacetic esters.

8. Process as claimed in claim 7 wherein the reaction is carried out in the presence of an inert liquid medium.

9. The process of claim 8 wherein said medium is trichloroacetic acid.

10. Process for the manufacture of triazine derivatives of the formula:

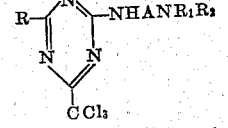

wherein R stands for a member of the group consisting of phenylguanidino and chlorophenylguanidino radicals, A stands for an alkylene linking group containing up to five carbon atoms, and R₁ and R₂ are selected from the group consisting of hydrogen, lower alkyl radicals and a piperidino radical formed by joining R₁ and R₂ together with the adjacent nitrogen atom, which comprises heating a compound of the formula:

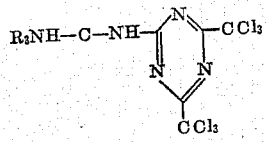

wherein R₃ is selected from the group consisting of phenyl and chlorophenyl radicals, with a compound of the formula:

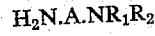

wherein A, R₁ and R₂ have the meaning stated above.

11. Process as claimed in claim 10 wherein the reaction is carried out in the presence of an inert liquid medium.

12. The process of claim 11 wherein said medium is benzene.

No references cited.